INVENTORS.
PETER G. COOPER
PHILIPPE A. MICHELON
CLARENCE R. MURPHY 3,461,139
DEHYDRATION OF BENZOPHENONE 3,4,3',4'-TETRACARBOXYLIC ACID TO BENZOPHENONE 3,4,3',4'-TETRACARBOXYLIC DIANHYDRIDE
Peter G. Cooper, Penn Township, Allegheny County, Philippe A. Michelon, Pittsburgh, and Clarence R. Murphy, Allison Park, Pa., assignors to Gulf Research & Development Company, Pittsburgh, Pa., a corporation of Delaware
Filed May 16, 1967, Ser. No. 638,992
Int. Cl. C07c 51/56
U.S. Cl. 260—346.3
9 Claims

ABSTRACT OF THE DISCLOSURE

Benzophenone tetracarboxylic acid is converted to benzophenone tetracarboxylic dianhydride by the application of heat. The highest temperature at which the dehydration can occur in the solid state is about 390° F. Theoretically, a 60° F. increase in temperature during solid state dehydration increases the dehydration rate by about a factor of 5. Unexpectedly, increasing the temperature in the 60° F. range from the solid state dehydration temperature of 390° F. to the molten state dehydration temperature of 450° F. increases the drying rate by a factor of nearly 100. However, temperatures which are sufficiently high to melt the dianhydride cause severe color degradation with excessive time from white or yellowish-white to tan or brown due to partial breakdown of the product. This color degradation limits the utility of the dianhydride product as a co-linking agent for epoxy resins. The surprising observation has been made that when a benzophenone tetracarboxylic dianhydride which is apparently discolored by the high temperatures required for molten state dehydration is cooled and granulated, the granulation operation results in a reversion of color from tan or brown to white or yellowish-white.

---

Figure 1:
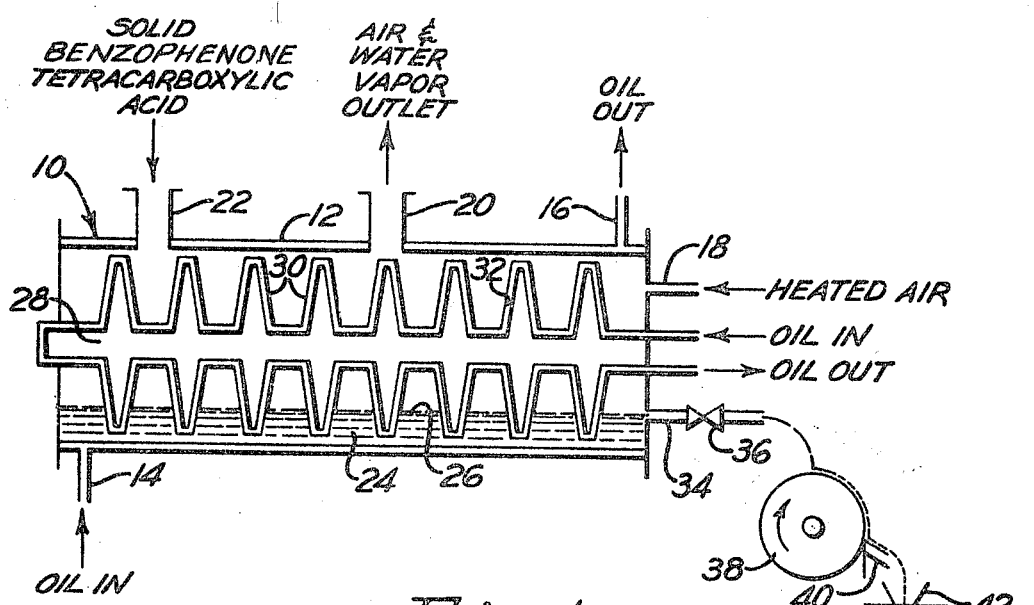

This invention relates to a process for the dehydration of benzophenone tetracarboxylic acid to benzophenone tetracarboxylic dianhydride.

Benzophenone 3,4,3',4'-tetracarboxylic acid, which is prepared as a white or yellowish-white powder, is dehydrated to the corresponding benzophenone tetracarboxylic dianhydride by the application of heat as follows:

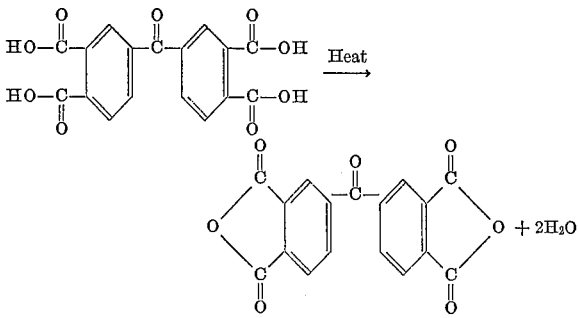

While the dehydration process requires the application of heat, the tetracarboxylic acid and its dianhydride are both highly sensitive to heat and readily degrade at least in part to form color bodies at elevated temperatures. Since tetracarboxylic dianhydride is utilized as a co-linking agent in epoxy resins, if the epoxy resin to be prepared is white, a benzophenone tetracarboxylic dianhydride which has been heat degraded so that it has a dark coloration could not be employed as a co-linking agent because it would impart a dark coloration to the resin.

In order to avoid exposure of the product to a high temperature during the dehydration process so as to prevent heat degradation, various expedients can be employed. For example, benzophenone tetracarboxylic acid, in the form of a white powder, can be dried as a powdery solid under a partial vacuum or can be subjected to a continual solid-state tumbling motion to assist the dehydration process. These methods satisfactorily accomplish dehydration without any significant darkening of the product and without any departure of the material under treatment from the powdery state. However, the drying rate is very low requiring approximately 24 hours to effect dehydration.

In general, the rate of the dehydration reaction has been severely limited by temperature considerations. While any increase in temperature increases the rate of dehydration, each increase in temperature above 390° F. also tends to impart a dark coloration to the product. For that reason, it has generally been considered that a temperature of about 390° F. represents about the upper limit for the dehydration process.

At a dehydration temperature above about 390° F. the benzophenone tetracarboxylic acid dehydrates into a dianhydride in a system which appears as a molten mass. The discoloration of the dianhydride product at temperatures above the melting point is much more severe than the discoloration at temperatures at which the dianhydride is a solid and the molten dianhydride mass quickly assumes a tan or a brown coloration. Because of this dark coloration, drying temperatures which produce a molten product have heretofore been avoided. However, we have discovered that the dark molten dianhydride product possesses the highly surprising characteristic that when it is solidified by cooling and then granulated or pulverized the resulting particulate mass exhibits a lighter color which can be white or yellowish-white. The grinding operation causes loss of the dark coloration and causes the product to revert to its white condition. Although the solidified molten mass even in a cracked or flaked condition is dark, after it is ground into a particulate condition it possesses substantially the same white coloration possessed by a dianhydride powder which is produced under much lower temperature conditions which are below the melting point of the dianhydride product.

The discovery of the present invention is highly unexpected in view of U.S. 2,937,189, which teaches that when pyromellitic dianhydride, also derived from a tetraacid and also an ingredient of epoxy resin formulations, is prepared by dehydration of pyromellitic acid in a molten state process the resultant pyromellitic dianhydride is badly charred and essentially worthless without further purification. This patent therefore teaches that the dehydration of pyromellitic acid should be carried out in the solid state. This is in direct contrast to the teachng of the present invention.

Another highly surprising feature of the process of this inventio,nf is the remarkably high dehydration rate which prevails when the product is molten. For example, 24 hours of drying are required to accomplish nearly complete dehydration at the solid state dehydration temperature of 390° F. which is nearly up to the melting point of the partially dehydrated product, even employing a partial vacuum of 28 inches of mercury, while only 15 to 20 minutes are required to accomplish nearly complete dehydration at the molten state temperature of 450° F. Theoretically, a 60° F. increase in temperature increases the dehydration reaction rate by a factor of only about 5, while increasing the temperature in the 60° range from the 390° F. solid state temperature to the 450° F. liquid state temperature increases the dehydration rate by a factor of nearly 100. Therefore, the method of this invention accomplishes dehydration of benzophenone tetracarboxylic acid to benzophenone tetracarboxylic dianhydride at a much faster dehydration rate than heretofore and in spite of the fact that color degradation of the product apparently occurs at the dehydration temperatures of the present invention which has up to now caused avoidance of these temperatures for the dehydration reaction.

In order for darkened molten dianhydride produced by the method of this invention to tend to subsequently revert substantially completely to the desirable white condition upon solidification and grinding or pulverization, it is important that substantially full advantage be taken of the rapid dehydration rate which is achievable with the method of this invention and that the duration of dehydration be held substantially to a minimum. In this regard, means can be employed to assist the dehydration operation. For example, some means for agitating the molten dehydration mass or for continually exposing a thin film to a drying atmosphere can be employed. Also, a dry purge gas can be circulated through the reactor to reduce the partial pressure of water vapor and to carry water vapor from the system to help drive the reaction to the right. Finally, the dehydration operation can be performed on a continuous basis so that dehydrated dianhydride produced is removed from the elevated temperature zone as rapidly as possible in order to repress color body formation to the greatest extent possible.

The method of this invention generally achieves at least about 95 weight percent conversion of benzophenone tetracarboxylic acid to the corresponding dianhydride, and preferably achieves at least about 96 or 97 weight percent conversion, and most preferably achieves about 98 or 99 weight percent conversion. In order that the discoloration imparted to the liquid during the dehydration process be reversible and not permanent, the time and temperature conditions of the process are important. The dehydration temperatures should be above about 440° F., which is the melting point of the dianhydride product, or between 440 and 550° F., generally, between 440 and 500° F., preferably, and between 450 and 475° F., most preferably. The charge tetraacid and product dianhydride can be held at these temperatures for not more than about 60 minutes, generally, not more than about 30 minutes, preferably, and not more than about 15 minutes, most preferably. The granulated dianhydride product can be of any convenient particle size which is sufficiently small to produce the desired white or yellowish-white coloration.

In the very slow solid state methods of dehydration of the prior art, the tetraacid is charged to the dehydrater as a white powder and is removed therefrom as a white or off-white powder. In the liquid state method of dehydration of this invention, the material can pass through various stages of discoloration in the process. A yellow state of discoloration represents a small loss of material to color bodies, a yellow-gray discoloration represents a greater degree of degradation, while a brown or black discoloration represents a still greater degree of degradation. The dehydration operation should be carried out as rapidly as possible in order to restrict loss of product to as low a level as possible and to insure that the color degradation will be reversible upon subsequent granulation.

The temperatures of the dehydration process of this invention are at a level at which it is common for organic materials to degrade and exhibit an obvious loss of quality. It is therefore surprising that a successful dehydration operation can be achieved in accordance with the method of this invention with no evidence of degradation appearing in the recovered product. The benzophenone tetracarboxylic acid does not have a sharp melting point because it begins to dehydrate before it melts. The benzophenone tetracarboxylic dianhydride has a melting point of about 440° F. The benzophenone tetracarboxylic acid can be charged to the dehydrator as it is prepared in a wet condition or it can be pre-dried of non-chemically combined water. If wet tetraacid were charged to a solid-state drying process, stickiness would be imparted to the product. However, no such difficulty arises in the molten state dehydration operation of this invention.

This invention will be more fully understood by reference to FIGURE 1 which shows in schematic form an advantageous apparatus for accomplishing the dehydration process. The apparatus comprises an enclosed drum 10 which is surrounded by a heat-exchange jacket 12. Oil which can be at a temperature between about 510° and 575° F. is charged to jacket 12 through line 14 and is removed through line 16. Heated air at a temperature which can be between about 500° and 550° F. is charged to the interior of the drum through line 18 and the air plus water of hydration is removed from the interior of the drum through line 20. Wet benzophenone tetracarboxylic acid is continuously charged through line 22 to the interior of drum 10 wherein it quickly melts under the elevated temperature conditions in the drum to produce a molten pool of liquid 24 having a level 26. Liquid pool 24 comprises a mixture of molten and solid material.

Drum 10 is provided with a jacketed shaft 28 capable of being rotated by motor means, not shown, at any suitable speed, such as, for example, speeds up to 100 r.p.m. Shaft 28 is provided with a plurality of integral paddles 30 which can be equidistantly spaced along the length of the shaft, as shown. Shaft 28 and paddles 30 are provided with a jacket 32 through which oil which can be at a temperature of between about 510° and 575° F. is circulated. As the shaft 28 is rotated the outer extremity of the paddles 30 sweep through the viscous molten pool so that the pool becomes agitated and a film of viscous liquid coats the extremity of each paddle 30 as it emerges from liquid pool 24. The film is heated on both sides thereof; on the inside by the oil and on the outside by the air. In this manner there is a continuous exposure of a liquid film to the heated air charged through line 18. Rotating shaft 28 and paddles 30 thereby accomplish the dual effect of agitating molten pool 24 and at the same time providing film-type drying, both of which effects tend to increase the rate of dehydration.

Discharge pipe 34 maintains level 26 in drum 10 and molten dianhydride at a temperature which can be between about 440° and 530° F. flows therethrough onto the outer surface of a rotating drum 38 at a rate which can be regulated by adjustment of valve 36. The molten dianhydride having a tan or brown coloration cools and solidifies on drum 38 and is scraped therefrom by scraper blade 40. Flakes of dianhydride fall into hopper 42 from which they are fed to a grinder 44 in which the flakes are granulated. Granulated dianhydride product having a white or yellowish-white coloration is discharged through line 46. The dianhydride product can average 60 to 80 mesh with 98 weight percent passing through 325 mesh.

The apparatus of FIGURE 1 can accomplish 97 to 98 weight percent conversion of benzophenone tetracarboxylic acid to the dianhydride in about 15 to 60 minutes. The material acquires a tan or brown coloration and then reverts to a white or yellowish-white coloration upon grinding. In contrast, the same degree of conversion in a batch process performed at about 390° F. (which is the highest temperature at which the product mixture does not melt) would require 20 to 24 hours if the tetraacid is dehydrated as a white or off-white powder on trays and is removed from the trays as a powder of white or off-white coloration.

Figure 2:
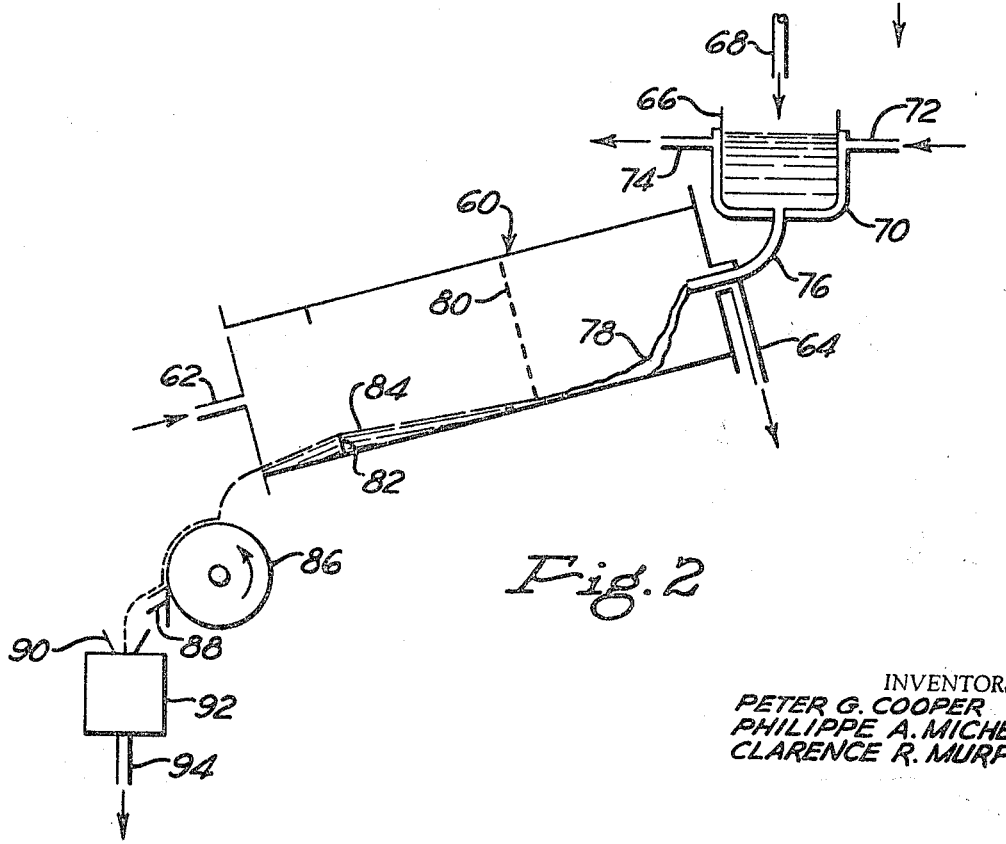

A specific example of this invention is described below in reference to the apparatus shown in FIGURE 2. FIGURE 2 schematically shows an inclined rotary kiln 60 which is rotated at about 10 r.p.m. by motor means, not shown. Kiln 60 has a line 62 which is attached to a kiln 60 by means of roller bearings, not shown, and through which about 100 cubic feet per hour of air at a temperature of about 550° F. is charged so that it flows in a countercurrent direction in the kiln and is discharged from the kiln through line 64. Line 64 is also attached to kiln 60 by means of roller bearings, not shown. About 22 pounds per hour of wet solid, granular benzophenone 3,4,3',4'-tetracarboxylic acid containing 13.6 percent by weight of total water is charged to melting tank 66 through line 68. Heating oil is charged to jacket 70 enclosing tank 66 through line 72 and is removed from the jacket through line 74. Melted solids with a small amount of entrained solid are removed from tank 66 and charged to the rotary kiln through line 76. The liquid and entrained solids flow down the rotary kiln as indicated at 78 and flow through a 10 mesh screen 80 which passes only liquid and prevents flow of solids therethrough. Ledge 82 causes a molten pool to develop as indicated at 84. Rotation of kiln 60 causes formation of a molten film on the walls thereof. The skin temperature of the molten film is about 550° F. and the liquid pool temperature is about 464° F.

Discolored molten product containing 98.1 weight percent dianhydride is discharged from kiln 60 onto rotating drum 86 whereat it cools and solidifies. Scraper 88 removes the solid dianhydride from the drum and permits it to fall into hopper 90 from which it enters grinder 92. Off-white granular dianhydride is discharged from grinder 92 through line 94.

EXAMPLE

A test was made utilizing the apparatus of FIGURE 1. Purge air for drying was passed through the apparatus at a rate of 300 standard cubic feet per hour at a temperature of 550° to 560° F. The paddles were rotated at a speed of 70 r.p.m. Benzophenone tetracarboxylic acid containing 4 weight percent free moisture was charged continuously at a rate of 80 pounds per hour, equivalent to 76.8 pounds per hour of dianhydride product. The residence time was 41 minutes. The pool temperature in the dehydrator was 480° F. The product comprised 97.9 weight percent of the dianhydride, 1.9 weight percent of tetraacid charge. The liquid was discolored but when cooled and granulated it possessed an off-white coloration about equivalent to the coloration of the charge tetraacid.

We claim:
1. A process for dehydrating benzophenone, 3,4,3',4'-tetracarboxylic acid to benzophenone tetracarboxylic dianhydride comprising performing said dehydration continuously and at a temperature between about 440° F. and 550° F. so that the system is in a molten state, a darkened discoloration being imparted to the dianhydride at said dehydration temperature, and cooling and solidifying the molten dianhydride to produce a solid dianhydride which upon granulation reverts to a lighter color.

2. The process of claim 1 including the step of granulating the solid dianhydride to produce a granular dianhydride product having a lighter color.

3. The process of claim 1 including the step of granulating the solid dianhydride to produce a granular dianhydride product having a whitish color.

4. The process of claim 1 wherein said dehydration is performed in the presence of a purge gas.

5. The process of claim 1 wherein said dehydration is performed with agitation of said molten system.

6. The process of claim 1 wherein the holding duration at said temperature is not more than about 60 minutes.

7. The process of claim 1 wherein the color of said molten dianhydride is tan to brown while the color of the granular dianhydride product is off-white.

8. The process of claim 1 wherein at least about 95 weight percent of said tetracarboxylic acid is converted to the dianhydride.

9. A process for dehydrating benzophenone 3,4,3',4'-tetracarboxylic acid to benzophenone tetracarboxylic dianhydride comprising performing said dehydration process continuously and at a temperature between about 440° and 550° F. so that the dianhydride formed is in a molten state during said process, charging a purge gas over said molten dianhydride, agitating said molten dianhydride, said temperature imparting a darkened discoloration to said molten dianhydride, the holding duration at said temperature being not more than about 60 minutes, continuously cooling and solidifying said molten dianhydride, granulating said solidified dianhydride to produce a granular dianhydride product, said granulation reverting said dianhydride to a whitish color, said process converting at least about 95 weight percent of said benzophenone tetracarboxylic acid to the dianhydride.

References Cited
UNITED STATES PATENTS
3,287,373  11/1966  McCracken et al. ___ 260—346.3

ALEX MAZEL, Primary Examiner

B. I. DENTZ, Assistant Examiner